Sept. 14, 1965  C. W. PARMENTER  3,206,560
DETACHABLE TROLLEY COLLECTOR
Filed Dec. 27, 1962  4 Sheets-Sheet 1
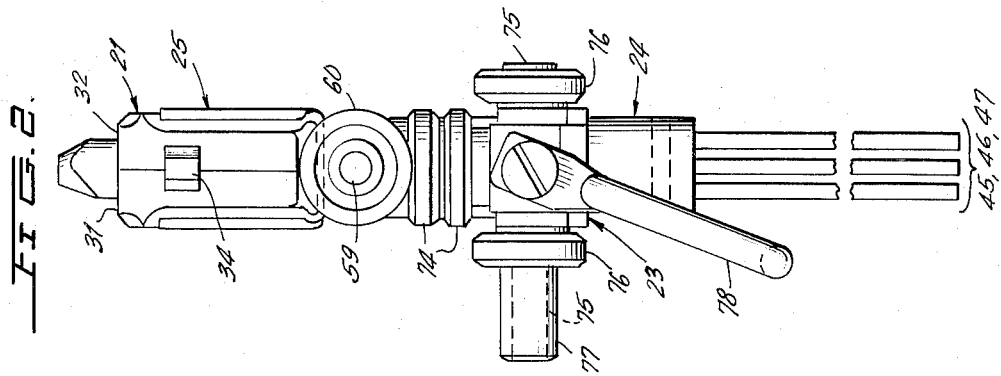
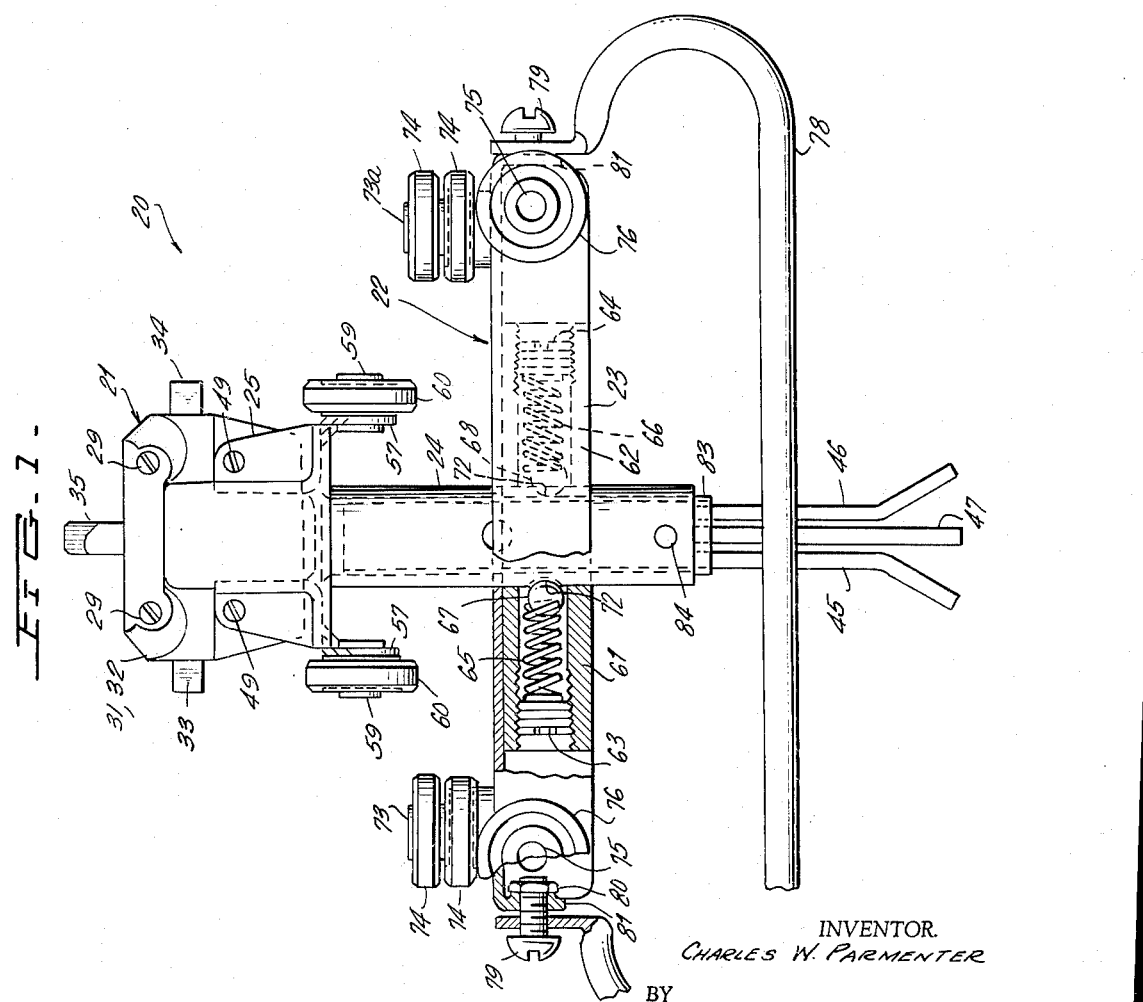
INVENTOR.
Charles W. Parmenter
BY
Ostrolenk, Faber, Gerb & Soffen
ATTORNEYS Sept. 14, 1965   C. W. PARMENTER   3,206,560
DETACHABLE TROLLEY COLLECTOR
Filed Dec. 27, 1962   4 Sheets-Sheet 2
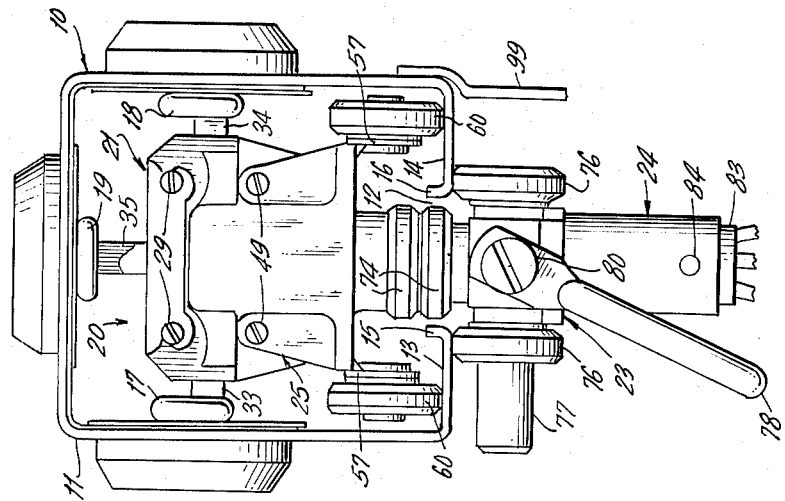
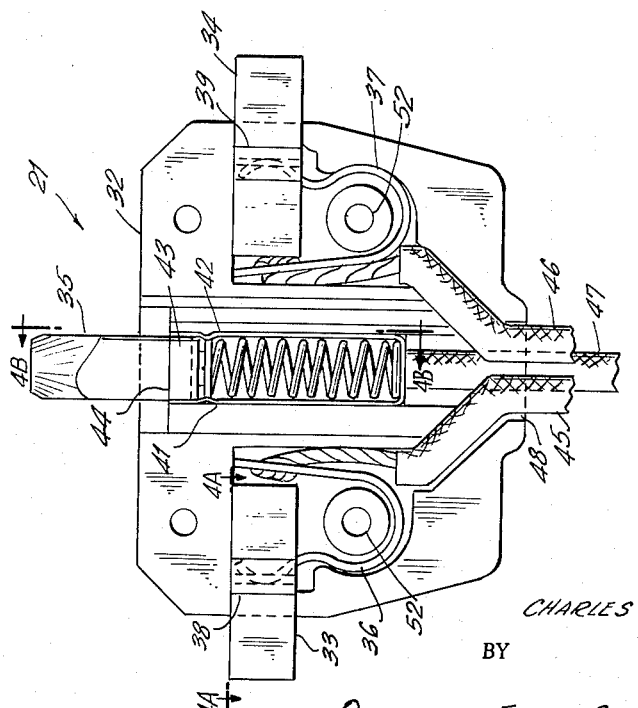
INVENTOR.
CHARLES W. PARMENTER
BY
OSTROLENK, FABER, GERB & SOFFEN
ATTORNEYS Sept. 14, 1965   C. W. PARMENTER   3,206,560
DETACHABLE TROLLEY COLLECTOR
Filed Dec. 27, 1962   4 Sheets-Sheet 3
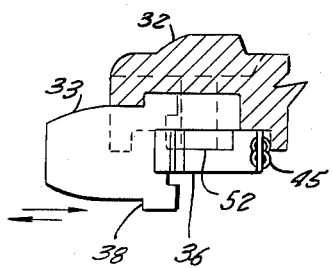
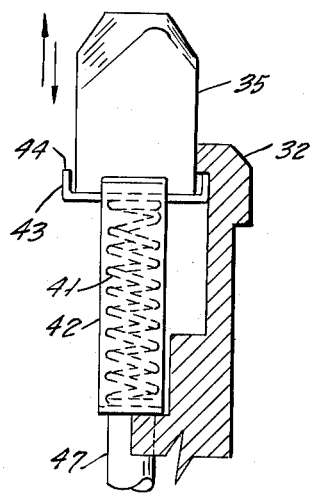
INVENTOR.
CHARLES W. PARMENTER
BY
OSTROLENK, FABER, GERB & SOFFEN
ATTORNEYS

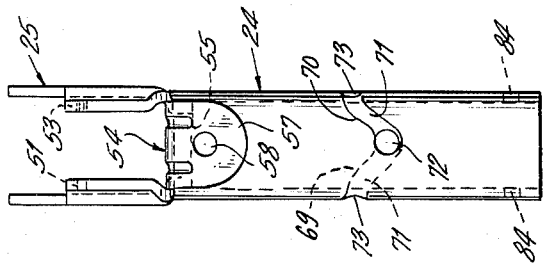
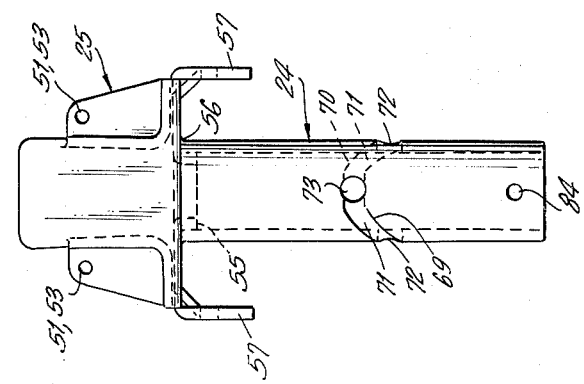
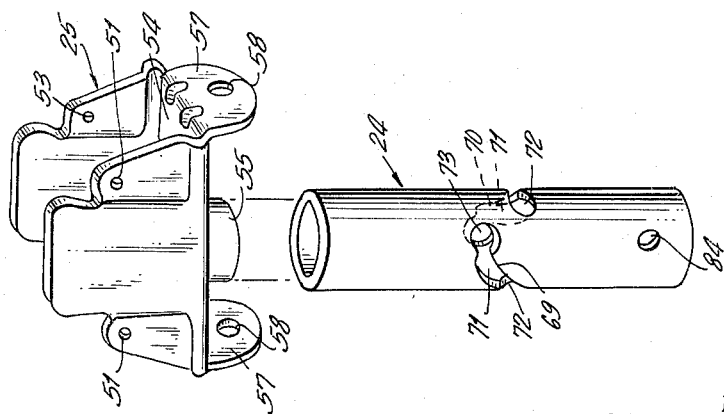

United States Patent Office 3,206,560
Patented Sept. 14, 1965

3,206,560
DETACHABLE TROLLEY COLLECTOR
Charles W. Parmenter, East Detroit, Mich., assignor to
I-T-E Circuit Breaker Company, Philadelphia, Pa., a
corporation of Pennsylvania
Filed Dec. 27, 1962, Ser. No. 247,642
11 Claims. (Cl. 191—45)

This invention relates to electrical distribution systems in general and more particularly to a trolley collector utilized with trolley duct.

As illustrated and described in United States Patents 2,170,296, issued August 22, 1939, to W. H. Frank et al., and 2,882,356, issued April 14, 1959, to R. S. Davis et al., a trolley collector is a device used for tapping electrical energy from a continuous outlet duct. The trolley collector is provided with wheels which ride on tracks formed integrally with the duct housing so that the trolley will readily move along the length of the duct as the need for this movement arises.

In general, trolley duct is utilized for energizing tools operating on a production assembly line. Each time the tool is added or removed from the assembly line it is desirable to also remove its energizing trolley collector from the duct.

In early trolley duct systems the collectors could only be inserted and removed at the ends of the duct. More recently trolley constructions have been provided which enable the trolleys to be inserted and removed from the duct at any point along the length thereof. In a typical construction of this type the trolley support wheels were mounted to brackets which were pivotally mounted to axes extending parallel to the length of the duct. Biasing means were provided to urge the support plates outward away from the longitudinal axis of the collector. This is a so-called floating load carrying wheel arrangement and has proven to be less than satisfactory in that the load carrying wheels tend to spread apart. The load carrying wheels are intended to be positioned in the lower corners of the duct so that spreading apart of the wheels also tends to spread the duct housing. This is undesirable since if there is misalignment between adjacent duct sections, there is a tendency for the load carrying wheels to jam and thereby twist the trolley out of operative position. If this twist is severe enough, the load carrying wheels have been known to ride over the flanges at the boundary of the longitudinally extending duct opening thereby causing the trolley to fall away from the duct.

The instant invention provides a construction which overcomes the difficulties of prior art constructions yet permits the simple insertion or removal of the trolley collector to take place at any point along the length of the duct. The tendency of the load carrying wheels to spread is obviated by having these wheels mounted to axes which are in fixed position relative to the trolley frame when the trolley is in operating position.

More particularly, the trolley frame consists of a body portion carrying rollers for limiting upward vertical shift and rollers for limiting side sway. The frame includes another portion to which the collector head is mounted with this latter portion being pivotally mounted about a vertical axis and also carrying the load bearing wheels. Guide means in the form of spiral indexing slots or grooves are provided to guide the rotative movement of the latter frame portion relative to the body portion with this motion being such that as the latter portion is rotated the trolley head carried thereby is moved toward or away from the body portion.

In the operating position for the trolley collector the trolley head is located closest to the body portion while with the trolley in dismounting position its head is located in a position most remote from the body portion.

With the trolley collector in its operating position the axes for the load carrying wheels are parallel to the axes for the wheels which limit vertical shifting while with the trolley collector in dismounting position the axes for the load carrying wheels are positioned transverse to the axes for the wheels which limit vertical shifting.

Accordingly, a primary object of this invention is to provide a novel construction for a trolley collector which may be inserted or removed from the duct at any point along the length thereof.

Another object is to provide a novel trolley collector of this type in which the load carrying wheels axes are fixed relative to the frame when the trolley collector is in operating position.

Still another object is to provide a trolley collector of this type in which the frame is provided with two sections rotatable with respect to each other with the rotative movement being guided by spiral indexing slots or grooves.

A further object is to provide a trolley collector of this type in which the collector head is rotated and moved vertically as the trolley collector is operated between dismounting and operating positions.

A still further object is to provide a trolley collector in which there is a U-shaped housing portion.

These as well as further objects of this invention shall become readily apparent after reading the following description of the accompanying drawings in which:

FIGURE 1 is a side elevation of a trolley collector constructed in accordance with the teachings of the instant invention with the trolley collector being shown in its dismounting position.

FIGURE 2 is an end view of the trolley collector of FIGURE 1 in its dismounting position.

FIGURE 3 is an end view showing the trolley collector of FIGURE 1 mounted in its operating position to a section of trolley duct.

FIGURE 4 is a side elevation of the trolley collector head with the rear casing section thereof removed.

FIGURES 4A and 4B are fragmentary cross sections of FIGURE 4 taken through lines 4A—4A and 4B—4B, respectively, looking in the directions of the respective arrows.

FIGURE 5 is a side elevation of the frame portion consisting of the U-shaped housing and the tubular depending neck portion.

FIGURE 6 is an end view of the elements of FIGURE 5.

FIGURE 7 is an exploded perspective of the elements of FIGURE 5.

Now referring to the figures. As seen in FIGURE 3, trolley duct 10 is of a type described in the aforesaid U.S. Patent 2,882,356 and consists of an elongated housing 11 having opening 12 in the bottom wall thereof. Opening 12 extends parallel to the longitudinal axis of housing 11 for the entire length thereof and divides the bottom wall into tracks 13 and 14. The inner ends of tracks 13, 14 are provided with upwardly turned flanges 15, 16, respectively, for a reason to be hereinafter explained. Flat bus bars 17 through 19 are disposed within housing 11 and positioned parallel to the longitudinal axis thereof. Bus bars 17 and 18 are secured in insulating relationship to the housing sidewalls while bus bar 19 is secured in insulating relationship to the top wall of housing 11.

Trolley collector 20 (FIGURE 1) comprises carriage 22 carrying collector head 21. Carriage 22 includes a frames consisting of body portion 3, tubular neck portion 24, and U-shaped housing portion 25. Head 21 (FIGURE 4) is of conventional construction including two piece molded case 31, 32 (see FIGURE 2) joined by fasters 29 (FIGURE 1) and having suitable cooperating depressions to receive and retain contact 33–35 which engage bus bars 17 through 19, respectively, when trolley collector 20 is in the operating position of FIGURE 3.

Generally U-shaped springs 36, 37 (FIGURE 4), disposed within recesses of case 31, 32, bias contacts 33, 34, respectively, through openings in opposite sides of case 31, 32 with this outward movement being limited by the engagement of contact shoulders 38, 39 with ledge formations of case 31, 32 (see FIGURE 4A). Coil spring 41 is nested between the arms of U-shaped conducting member 42 with one end of spring 41 bearing against the web of member 42 and the other end bearing against bracket 43 to which contact 35 is mounted. The engagement of bracket edges 44 with suitable internal formations of case 31, 32 limits outward movement of contact 35 (see FIGURE 4B). Insulation cover wires 45, 46 connected to springs 36 and 37, respectively, as well as insulation cover wire 47 connected to U-shaped member 42 extend downwardly through housing aperture 48 for connection to an external load.

As best seen in FIGURE 2, collector head 21 is mounted between the arms of housing portion 25, being secured in place by screws 49 which extend through clearance apertures 52 and 51 in case 31, 32 and a wall of housing portion 25, respectively, and are received by threaded apertures 53 in the other wall of housing portion 25.

The central portion of housing portion web 54 is provided with an aperture surrounded by downwardly extending lip 55 (see FIGURE 7). The latter enters the upper end of tubular neck portion 24. Welding bead 56 at the upper end of neck portion 24 rigidly secures the neck and housing portions 24, 25 to each other. The close fit between the external surface of lip 55 and the internal surface of neck portion 24 adds mechanical stability to the assembly.

The ends of web 54 are downwardly turned to form bearing brackets 57 provided with apertures 58 which receive stub shafts 59 (see FIGURES 1 and 2). Load bearing wheels 60 mounted to shafts 59 are positioned outboard of the housing portion U-arms. Body portion 23 comprises an elongated channel member having solid block inserts 61, 62 extending outwardly from a central aperture through which tubular neck portion 24 extends. The outward extensions of inserts 61 are provided with threaded apertures having adjusting screws 63, 64, respectively, disposed therein. Blocks 61, 62 are provided with longitudinal passages aligned with the threaded apertures, with these passages housing coil springs 65, 66, respectively. One end of springs 65, 66 bear against adjusting screws 63, 64, respectively, while the other ends bear against guide balls 67, 68, respectively. The latter are biased into guide slots or indented grooves 69, 70, respectively (FIGURE 7), of tubular neck portion 24. All portions of slots or grooves 69, 70 are narrower than the diameter of balls 67, 68.

As best seen in FIGURES 5 through 7, each of the slots 69 and 70 includes spiral portion 71 extending between detent portions 72, 73 with the latter being disposed 90° from each other. Balls 67, 68 mount tubuar neck portion 24 for limited rotative movement about a vertical axis with respect to body portion 23. This rotational movement is guided by slots or grooves 69, 70 so that the movement is not only rotational about a vertical axis 10 but is also along this axis, for a reason to be hereinafter explained. With balls 67, 68 in lower detent portions 72, trolley collector 20 is in a dismounting position as will be hereinafter explained while with balls 67, 68 in upper detent portions 73 trolley collector 20 is in operating position as will be hereinafter explained.

Vertically extending stub shafts 73a are disposed at opposite ends of body portion 23 and each mounts a set of two rollers 74, 74 provided to stabilize against side sway as will be hereinafter explained. Each end of body portion 23 is provided with a pair of outwardly extending stub shafts 75 which mount wheels 76 for limiting upward vertical movement of trolley collector 20 as will be hereinafter explained. Shafts 75 on one side of body portion 23 mount outwardly extending sleeves 77 which cooperate with duct housing rib 99 to constitute a polarizing means.

Pivotally mounted U-shaped handle 78 is secured at its ends by screws 79 and nuts 80 to downward extensions 81 at the ends of the body portion web. Handle 78 is provided to facilitate movement of trolley collector 20 along trolley duct 10. Conductors 45 through 47 extending downwardly from collector head 21 pass through insulating sleeve 83 lining tubular neck portion 24. The bottom of neck portion 24 is provided with aligned apertures 84 displaced 180° from one another (see FIGURE 6). Apertures 84 are adapted to receive an appliance (not shown) for rotating neck portion 24 with respect to body portion 23 when trolley collector 20 is to be moved between its operating and dismounting positions.

In FIGURE 3 trolley collector 20 is in its operating position. In this position load bearing wheels 60 rest upon tracks 13, 14; collector head contacts 33–35 are in engagement with bus bars 17–19, respectively; wheels 76 are disposed adjacent to the underside of the duct housing; and rollers 74 are disposed between housing flanges 15, 16. In this position, as trolley collector 20 is moved along duct 10 wheels 60 are supported by tracks 13, 14. Upward movement of trolley collector 20 is limited by the engagement of rollers 76 with the underside of the duct housing. Side sway is limited through the engagement of rollers 74 with upturned flanges 15, 16.

In order to dismount trolley collector 20 from duct 10 it is necessary to rotate collector head 21 and housing portion 25, 90° to a position where they will fit through duct housing opening 12. This cannot be a simple 90° rotation because of the presence of upturned flanges 15, 16. Thus, as housing portion 25 is rotated load bearing wheels 60 must also be raised above the upper ends of flanges 15, 16. Accordingly, the purpose of spiral guide slots or grooves 69, 70 is evident. That is, slots or grooves 69, 70 guide movement of neck portion 24 so that as the latter is rotated 90° clockwise from the position of FIGURE 3 portion 24 will also move upwardly with respect to its longitudinal axis thereby enabling load bearing wheels 60 to clear the upper edges of flanges 15, 16.

Conversely, a 90° counterclockwise rotative movement of neck portion 24 will move trolley collector 20 from the dismounting position (FIGURE 2) to the operating position (FIGURE 3).

In order to provide for this upward movement of collector head 21, contact 35 is elongated and coil spring 41 is constructed so that it will be able to collapse a good deal from the position it occupies in FIGURE 3. The detent portions 72, 73 of guide slots or grooves 69, 70 are slightly wider than the width of spiral portion 70 so it will be necessary to compress springs 65, 66 slightly in order to move collector head 21 from either the operating or dismounting position. Screws 63, 64 are provided in order to adjust the pressure with which springs 65 and 66, respectively, bear against balls 67, 68, respectively.

Thus, this invention provides a novel construction for a trolley collector which may be mounted or dismounted from the trolley duct at any position along the length thereof. The construction is such that the likelihood of jamming in or falling from the duct is substantially eliminated.

Although there has been described a preferred embodiment of this novel invention, many variations and modifications will now be apparent to those skilled in the art. Therefore, this invention is to be limited, not by the specific disclosure herein, but only by the appending claims.

The embodiments of the invention in which an exclusive privilege or property is claimed are defined as follows:

1. A device of the class described comprising a frame including a first elongated section and a second elongated section rotationally mounted at one end thereof to said first elongated section for movement between a first and a second position, first wheel means carried by said first section and positioned to engage a duct housing at its bottom outside surface, second wheel means carried by said second section and positioned to engage the duct housing at its bottom inside surface when said second section is in said first position, a first and second axis of rotation for said first and said second wheel means, respectively; said first and said second axis of rotation being parallel to each other when said second section is in said first position; said first and said second axis of rotation being transverse to each other when said second section is in said second position; and a first guide means guiding said second section for movement along its axis simultaneously with its rotational movement.

2. The device of claim 1 in which the first and second axis of rotation means are closer to one another when said second section is in said first position than when said second section is in said second position.

3. The device of claim 2 in which the first guide means includes a groove and means riding in said groove.

4. The device of claim 2 in which said first guide means also includes a groove in a radially spring pressed means riding in said groove.

5. The device of claim 4 in which there are detent portions at opposite ends of said groove.

6. The device of claim 5 in which the detent portions are wider than other portions of said groove.

7. The device of claim 4 in which the second section is provided with means defining said groove and said first section carries said spring pressed means, said groove being a portion of a spiral.

8. The device of claim 4 in which there is a collector head mounted at the other end of said second section.

9. The device of claim 4 also comprising a third wheel means mounted to said first section upon axis means parallel to the axis of rotation of said second section, said third wheel means operatively adapted to engage lips forming a longitudinal opening in a duct bottom wall to limit side sway of said device.

10. The device of claim 7 in which the spring pressed means comprises a ball whose diameter exceeds the width of said groove and a spring urging said ball into said groove in a direction transverse to the axis of rotation for said second section.

11. The device of claim 8 in which the collector head includes an insulating housing and a bus bar engaging contact projecting through an opening in the top of said housing, biasing means within said housing urging said contact upwardly parallel to the axis of said second section.

References Cited by the Examiner

UNITED STATES PATENTS

| | | | |
|---|---|---|---|
| 192,600 | 7/77 | Ryan | 248—161 |
| 1,679,333 | 7/28 | Douglas | 200—51.13 |
| 2,018,016 | 10/35 | Frank et al. | 191—45 |
| 2,537,866 | 1/51 | Tanner | 191—23 |
| 2,671,354 | 3/54 | Goos | 200—160 X |

EUGENE G. BOTZ, *Primary Examiner.*

JAMES S. SHANK, LEO QUACKENBUSH, *Examiners.*